United States Patent [19]

Marx

[11] Patent Number: 4,693,647

[45] Date of Patent: Sep. 15, 1987

[54] MULTI-TOOL DOWEL HOLE DRILLING MACHINE

[76] Inventor: Sherwood D. Marx, 6478 S. M St., Tacoma, Wash. 98408

[21] Appl. No.: 795,328

[22] Filed: Nov. 6, 1985

[51] Int. Cl.[4] ........................... B23C 9/00; B23Q 5/22
[52] U.S. Cl. ...................................... 409/163; 408/62
[58] Field of Search ............... 409/145, 162, 163, 180, 409/175; 408/62, 63, 64, 65, 99, 136

[56] References Cited

U.S. PATENT DOCUMENTS

| 18,872 | 12/1857 | Stevens | 408/62 |
|---|---|---|---|
| 170,980 | 12/1875 | Badger | 408/62 |
| 250,167 | 11/1881 | Parker | 409/163 |
| 700,000 | 5/1902 | Young | 408/99 |
| 1,982,025 | 11/1934 | Russell | 408/62 |
| 1,984,388 | 12/1934 | Wilkes | 408/62 |
| 2,166,831 | 7/1939 | Wazac | 408/65 |
| 2,712,839 | 7/1955 | Harpell et al. | 408/62 |
| 2,717,011 | 9/1955 | Phinn | 408/62 |
| 2,995,069 | 8/1961 | Wahlstrom | 409/233 |
| 3,045,727 | 7/1962 | Clarke | 408/64 |
| 3,489,040 | 1/1970 | Westhoff | 408/62 |
| 4,061,437 | 12/1977 | Strange et al. | 408/127 |
| 4,174,917 | 11/1979 | Brower | 408/62 |
| 4,235,565 | 11/1980 | Albano | 408/99 |
| 4,419,031 | 12/1983 | Palma | 408/136 |

FOREIGN PATENT DOCUMENTS

| 489511 | 1/1953 | Canada | 408/62 |
|---|---|---|---|
| 2801305 | 7/1979 | Fed. Rep. of Germany | 408/130 |
| 175089 | 2/1922 | United Kingdom | 408/62 |

*Primary Examiner*—William R. Briggs
*Attorney, Agent, or Firm*—Graybeal, Jensen & Puntigam

[57] ABSTRACT

A high speed dowel hole drilling machine is provided, comprising a machine tool selected from several different high speed rotary machine tools, said machine tool rotating a drilling element at speeds between about 5,000 RPM and 30,000 RPM, and preferably at speeds from 20,000 RPM to 30,000 RPM, a reciprocally translatable work table for slidably supporting a workpiece to be drilled, and a tool plate for mounting the machine tool adjacent the work table such that the workpiece can be translated toward and away from the drilling element of the machine tool mounted on the tool plate. An adaptor plate having plural sets of tool mounting holes provides means for mounting several different rotary machine tools on the tool plate, allowing conventional pre-owned machine tools to be used with the invention.

3 Claims, 4 Drawing Figures

MULTI-TOOL DOWEL HOLE DRILLING MACHINE

BACKGROUND OF THE INVENTION

1. Technical Field

This invention relates to doweling machines, and more particularly to a high speed dowel hole drilling machine adaptable to several different machine tools for rotating drilling elements at high speed.

2. Description of the Prior Art

Doweling is the process of joining two structural elements, usually wooden, to each other along two adjoining surfaces using one or more pegs, each peg inserted at each end into a dowel hole extending perpendicularly into one of said surfaces. Doweled joints are generally stronger than simple glued joints. Strong doweled joints require the dowel holes to be absolutely perpendicular to the joined surface of the element in which they are drilled. Skewed dowel holes can produce stresses on the peg, weakening the resulting joint, as well as considerably complicating the insertion of the peg into the hole. Examples of specially adapted or designed machines for drilling dowel holes are found in Palma, U.S. Pat. No. 4,419,031 for Apparatus and Method for Drilling Dowel Holes, Albano, U.S. Pat. No. 4,235,565 for Precise Dowel Joint Woodworking Device, and Brower, U.S. Pat. No. 4,174,917 for Doweling Guide. Most such conventional dowel hole drilling machines use a relatively low speed drilling element, rotating at speeds under 5,000 RPM. Such low drilling speeds produce significant vibration in the workpiece, requiring some sturdy means for clamping the workpiece to prevent misalignment of the resulting hole. Low speed dowel hole drilling machines also necessarily require more time to drill a single dowel hole than does a high speed dowel hole drilling machine.

SUMMARY OF THE INVENTION

It is thus an object of this invention to provide a high speed dowel hole drilling machine with a machine tool rotating a drilling element at high speeds between about 5,000 RPM and 30,000 RPM, and preferably from 20,000 RPM to 30,000 RPM.

It is another object of this invention to provide a dowel hole drilling machine which is adaptable to several different rotary machine tools, so that the same dowel hole drilling machine can be used by crafts persons each having one of several different such machine tools.

These and other features and advantages of the high speed dowel hole drilling machine of the present invention which will become apparent from the following detailed description of a typical embodiment thereof, taken in conjunction with the accompanying drawings, are provided by a high speed dowel hole drilling machine comprising: a high speed rotary machine tool rotating a drilling element at a speed between about 5,000 RPM and 30,000 RPM, and preferably from 20,000 RPM to 30,000 RPM; a vertical rectangular tool plate having a vertically elongated, slightly curved tool plate drill opening; a vertical hexagonal adaptor plate having a circular adaptor plate for mounting any one of several different rotary machine tools on the tool plate by means of a set of tool mounting holes selected from plural sets of tool mounting holes disposed through the adaptor plate, said adaptor plate including three adaptor plate mounting holes for mounting the assembled adaptor plate and machine tool on the tool plate such that the height of the drilling element above the work table can be adjusted by pivoting the assembled adaptor plate and machine tool around a plate mounting bolt extending through an adaptor plate mounting hole and a tool plate mounting hole and sliding a second plate mounting bolt extending through a second adaptor plate mounting hole along the length of a vertically elongated slightly curved tool plate mounting slot, said adaptor plate further including an adaptor plate drill opening; a horizontal, reciprocally translatable work table having workpiece positioning means including a recessed track with opposed track strips flush with the table surface, a positioning block with block securng means, and a vertical guide rail; a support frame comprising a vertical end plate opposite the tool plate, and two upper and two lower frame rods extending horizontally between and fixedly connected to the end plate and the tool plate; and two carrier tubes attached to the underside of the work table and encircling the upper frame rods of the support frame.

DESCRIPTION OF THE PREFERRED EMBODIMENT

Figure 1:
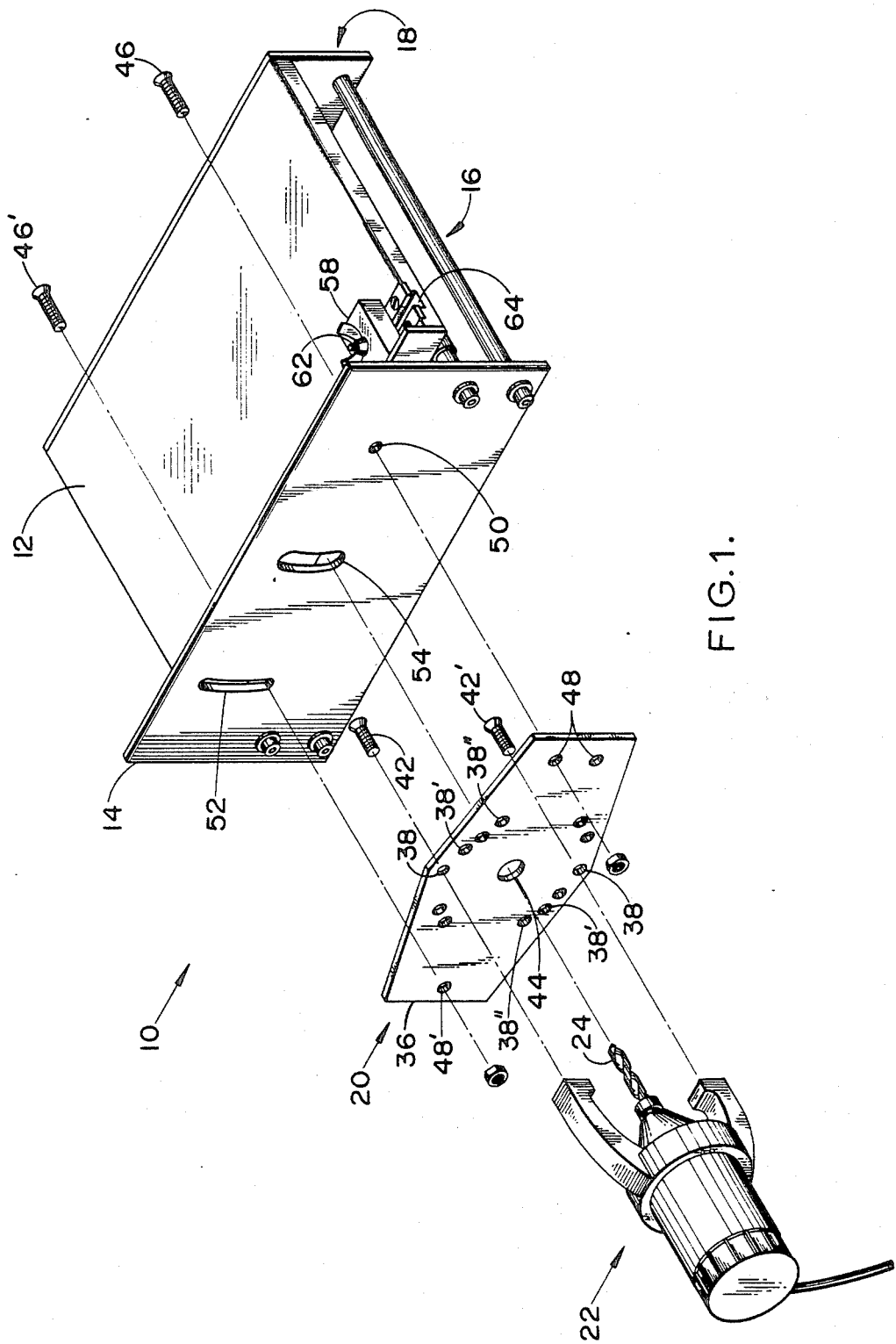
FIG. 1 is a three dimensional perspective view of the high speed dowel hole drilling machine, showing particularly the work table, the tool plate and the machine tool mounted thereon.

As shown in FIG. 1, the high speed dowel hole drilling machine 10 of this invention comprises a horizontal work table 12, a vertical tool plate 14, a carriage 16 slidably supporting the work table, a support frame 18 supporting the table carriage and the tool plate upon a horizontal surface such as a conventional workbench (not shown), a tool adaptor 20 adjustably and detachably mounted on the tool plate, and any one of several different high speed rotary machine tools 22 detachably mounted on the adaptor plate. A workpiece (not shown) in which a dowel hole is to be drilled is placed and manually held upon an upper flat surface of the work table 12. To drill the dowel hole, the machine tool 22 is activated and the work table 12 is manually translated toward the tool plate 14 upon which the adaptor plate 20 and machine tool are mounted, causing a drilling element 24 of the machine tool to progressively drill the dowel hole in the workpiece.

The high speed at which the dowel hole is drilled in the workpiece is a critical element of the invention, dispensing as it does with any need for clamping means for removably securing the workpiece to the work table 12. A higher drilling speed produces a significantly cleaner, more accurate dowel hole than a lower drilling speed. And finally, the high drilling speed, together with the apparent ease with which the drilling machine 10 and the workpiece can be prepared for drilling, allows the user to drill dowel holes far more rapidly than with prior art doweling machines.

The machine tool 22 is a conventional rotary machine tool rotating the drilling element 24 at high speeds between about 5,000 RPM and 30,000 RPM, and preferably from 20,000 RPM to 30,000 RPM. The drilling element 24 depends from the machine tool 22, having a proximal end of the drilling element removably attached to the machine tool, and an opposed distal end with cutting means for cutting the dowel hole disposed thereon. A major feature of the present invention allows the machine tool 22 to be selected from several different rotary machine tools capable of achieving the high speeds required by the invention, particularly including conventional routers and grinders as well as high speed drills. This feature allows a user who already owns a high speed rotary machine tool to use said machine tool as part of the dowel hole drilling machine 10 of this invention. The user is not forced to purchase a specialized machine tool suitable only for dowel hole drilling. The drilling element 24 can be a conventional power drill bit such as is used in conventional low- and mid-speed power drills, or it can be a special high speed drilling element, provided only that it can be safely operated at the high speeds employed in the present invention.

Figure 2:
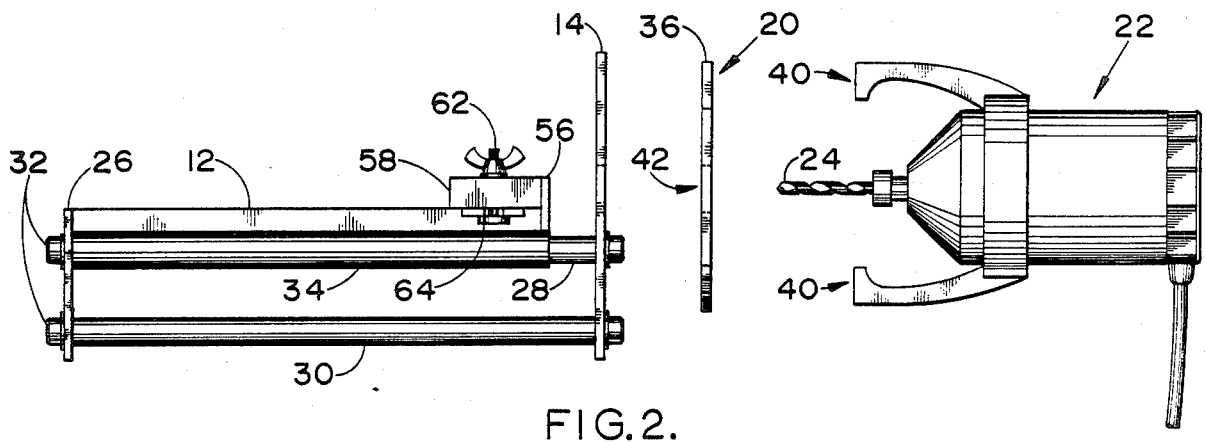
FIG. 2 is a side elevation of the dowel hole drilling machine of FIG. 1, showing the carriage and the support frame supporting the work table.

As best seen in FIG. 2, the suppport frame 18 comprises a vertical rectangular end plate 26, two upper frame rods 28, and two lower frame rods 30. The vertical end plate 26 stands on edge upon the workbench or other horizontal surface on which the drilling machine is placed, with a longer side edge parallel to said workbench surface and a shorter side edge perpendicular thereto. In the present embodiment of the invention, the end plate 26 measures four inches (4") high, eighteen inches (18") long, and approximately one quarter inch ($\frac{1}{4}$") thick. The upper frame rods 28 and lower frame rods 30 are detachably attached perpendicularly to the end plate 26, and extend between the opposed facing surfaces of the end plate and the tool plate 14, thus paralleling the surface of the workbench. The lower frame rods 30 are spaced upwardly from the surface of the workbench three quarters inch ($\frac{3}{4}$") on the center, while the upper frame rods 28 are spaced upwardly from said surface approximately three inches (3"). Each upper frame rod 28 and lower frame rod 30 comprises a one half inch ($\frac{1}{2}$") diameter rod approximately fourteen inches (14") long, with the interior circumferential surface threaded for a predetermined distance inward from each end of said rod, said threads mating with the threads of a conventional round frame rod bolt 32. The upper frame rods 28 and lower frame rods 30 are fixedly attached to the end plate 26 and tool plate 14 by means of said frame rod bolts 32 inserted through bolt holes in said plates.

The carriage 16 is slidably supported by the upper frame rods 28, and comprises two carrier tubes 34, each tube coaxial with and encircling one of the upper frame rods 28. Each carrier tube 34 is fixedly attached to the underside of the work table 12 parallel to a shorter side edge of said work table, and spaced approximately one inch (1") inwardly from said side edge. The interior diameter of each carrier tube 34 is slightly larger than the exterior diameter of the upper frame rod 28 encircled by said tube, causing the carrier tube to slide smoothly and accurately along the rod. The length of the carrier tubes 34 is approximately one and one half inch ($1\frac{1}{2}$") less than the length of the upper frame rods 28, allowing the work table 12 to be translated between the tool plate 14 and the end plate 26 a maximum distance of said one and one half inch ($1\frac{1}{2}$").

Figure 4:
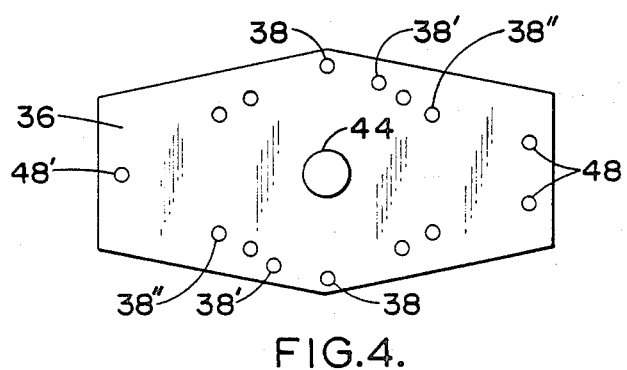
FIG. 4 is a plan view of the adaptor plate, showing particularly the plural sets of adaptor plate tool holes disposed therein.

The tool adapter 20 allows any one of several different machine tools 22 to be used in the dowel hole drilling machine 10 of this invention, by first detachably mounting the selected machine tool on the tool adapter 20, and then detachably mounting the assembled tool adapter and machine tool on the tool plate 14. The tool adaptor 20 comprises an adaptor plate 36, tool mounting means for mounting the selected machine tool 22 on the adaptor plate, and plate mounting means for mounting the assembled adaptor plate and machine tool on the tool plate 14. As presently preferred, the tool mounting means comprises a plurality of sets of adaptor plate tool holes 38, 38', 38" extending through the adaptor plate 36. Each of the several different rotary machine tools 22 useable with the drilling machine 10 of the present invention has a particular and usually unique member and configuration of threaded tool mounting holes 40, determined by the manufacture of the particular machine tool being considered. It is a characteristic of the rotary machine tools 22 employable with the invention that the open ends of the all of the tool mounting holes of each said machine tool lie in a plane perpendicularly normal to the longitudinal axis of the drilling element 24 of the machine tool 22. For each such machine tool, the adaptor plate 36 has a particular set of adaptor plate tool holes 38 corresponding in number and configuration to the tool mounting holes 40 of the machine tool 22. The machine tool 22 is fixedly attached to the adaptor plate 36 by inserting two conventional flat-headed threaded tool mounting bolts 42, 42' through the adaptor plate tool holes 38, 38' and threadably engaging them with the tool mounting holes 40, 40' of the selected rotary machine tool. As seen in FIG. 4, the adaptor plate 36 as presently preferred comprises plural sets of adaptor plate tool holes 38, 38', 38" accommodating a broad range of both popular and specialized rotary machine tools, particularly high speed routing and grinding tools. It is contemplated that otherwise employable machine tools having non-coplanar tool mounting holes 40 could be used with the present invention by using extension means for creating a rigid connection between each non-coplanar tool mounting hole and the flat adaptor plate 36.

When mounted the on the tool plate 14, the laterally elongated hexagonal adaptor plate 36 is oriented with a longest dimension as measured between two opposite parallel vertical side edges being substantially horizontal and parallel to the longer horizontal dimension of the tool plate, and said vertical side edges being substantially perpendicular to the workbench surface. A one inch (1") diameter round adaptor drill opening 44 located at the center of the adaptor plate 36 permits the drilling element 24 of the machine tool 22 to extend through the adaptor plate.

The height of the drilling element 24 above the work table 12 must be adjustable if dowel holes are to be drilled at varying distances inwardly from a horizontal surface of the workpiece. Referring again to FIG. 1, this height adjustment is accomplished by adjustably mounting the assembled tool adaptor 20 and machine tool 22 on the tool plate 14 using plate mounting means comprising two conventional threaded flat-head plate mounting bolts 46, 46' with conventional threaded nuts, three adaptor plate mounting holes 48, 48' extending through the adaptor plate 36, a single tool plate mounting a hole 50 extending through a first side portion of the tool plate 14, and a tool plate mounting slot 52 extending through an opposite second side portion of said tool plate. The height of the drilling element 24 above the work table 12 is adjusted by inserting and fixing in place the first plate mounting bolt 46 through either the first or the second adaptor plate mounting hole 48 and then through the tool plate mounting hole 50, and then pivoting the assembled adaptor plate 36 and machine tool 14 around the longitudinal axis of said first plate mounting bolt 46, causing the second plate mounting bolt 46' inserted in the third adaptor plate mounting hole 48' to slide in the tool plate mounting slot 52. The assembly is fixed in the desired position by firmly tightening the plate mounting bolts 46, 46' against their respective threaded nuts. The first and second adaptor plate mounting holes 48 are centered parallel to and spaced approximately one inch (1") inwardly from a first vertical side edge of the adaptor plate 36, and separated vertically from each other by approximately two inches (2"), thus being located one inch (1") respectively above and below a horizontal centerline of the adaptor plate. The third adaptor plate mounting hole 48' is centered approximately one inch (1") inwardly from an opposite second side edge of the adaptor plate 36, and aligned with the horizontal centerline of the adaptor plate. Thus the third adaptor plate mounting hole 48' is separated horizontally from both the first and second adaptor plate mounting holes 48 by approximately ten inches (10"). The tool plate mounting hole 50 is located approximately five inches (5") horizontally from the vertical centerline of the tool plate 14 toward a first vertical side edge of said tool plate, and approximately three inches (3") downward from the upper horizontal edge of the tool plate. The vertically elongated, approximately two inch (2") long tool plate mounting slot 52 is located approximately five inches horizontally from said vertical centerline of the tool plate 14 toward an opposite second vertical side edge of said tool plate, and extends downwardly from an upper end approximately two inches (2") below the upper horizontal edge of the tool plate 14 to a lower end approximately four inches (4") below said upper edge. The tool plate mounting slot 52 is slightly curved to maintain a constant distance of approximately ten inches (10") between the centerline of said tool plate mounting slot and the center of the tool plate mounting hole 50. The diameters of the adaptor plate mounting holes 48, 48' and the tool plate mounting hole 50, and the width of the tool plate mounting slot 52, are sufficient to accept a plate mounting bolt 46 without excessive looseness. It is of course understood that alternative tool adaptors for allowing the use of any selected one of several different high speed rotary machine tools are contemplated, and that alternative adjustable plate mounting means for detachably mounting the assembled tool adaptor 20 and machine tool 22 on the tool plate are also possible. However, the adaptor plate 36, tool mounting means and plate mounting means described above have been found to best combine dependability of operation, simplicity of fabrication and minimization of overall cost of the dowel hole drilling machine of this invention.

When the assembled tool adaptor 20 and machine tool 22 are mounted on the tool plate 14, the drilling element 24 extends from the machine tool through the adaptor and the tool plate toward the work table 12 through the adaptor drill opening 44 in the adaptor plate 36 and through a tool plate drill opening 54 in the tool plate 14. The tool plate drill opening 54 is a vertically elongated, one inch (1") wide slot located near the vertical centerline of the tool plate 14, extending from an upper end spaced approximately two inches (2") below the upper horizontal edge of the tool plate to a lower end spaced approximately four inches (4") below said upper edge. The tool plate drill opening 54 is slightly curved to maintain a constant distance between the centerline of said drill opening and the center of the tool plate mounting hole 48, so that when the assembled adaptor plate 36 and machine tool 22 is pivoted around the longitudinal axis of the first plate mounting bolt 46 a constant safety clearance is maintained between the drilling element and the edge of the slot comprising the tool plate drill opening. Because the drilling element 24 does not change position relative to the adaptor plate 26, the adaptor drill opening 44 is a simple round one inch (1") diameter opening. The one inch (1") width of the tool plate drill opening 54 and the one inch (1") diameter of the adaptor plate drill opening 44 have been selected as best allowing the use of several different drilling elements 24, particularly conventional drill bits and router bits, in the dowel hole drilling machine 10 of this invention, while maintaining an adequate safety clearance.

Figure 3:
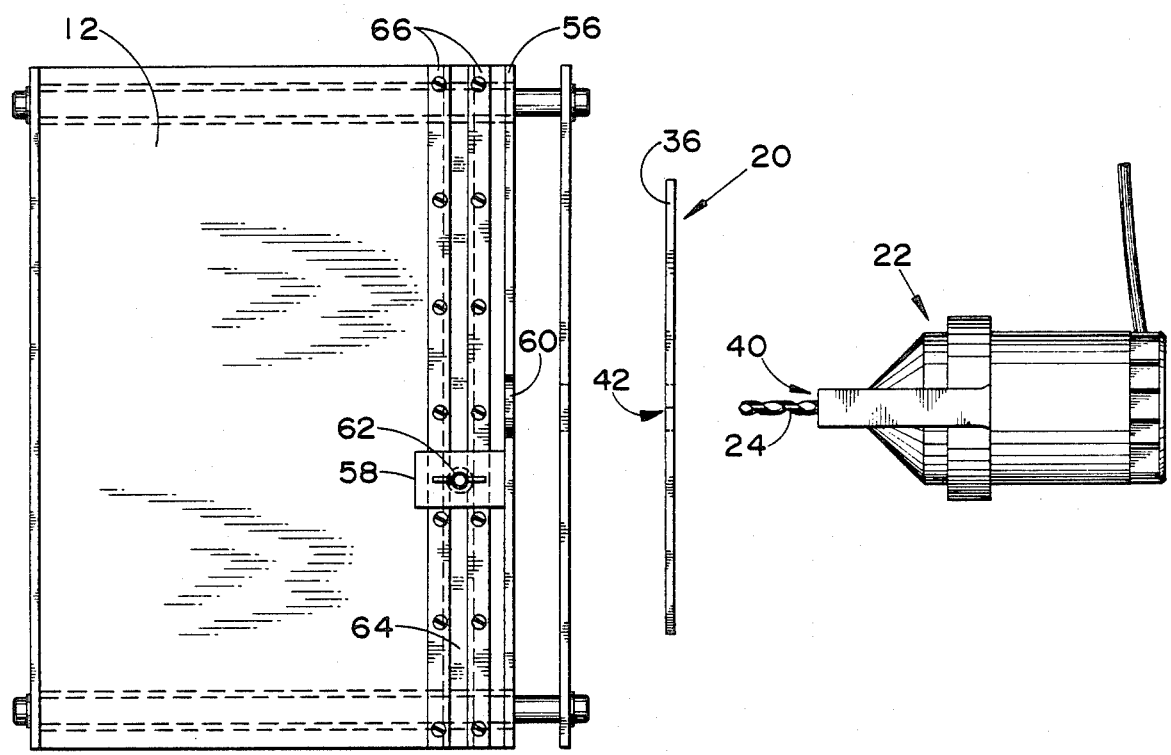
FIG. 3 is a plan view from above the dowel hole drilling machine of FIG. 1, showing the work table and the positioning block and guide rail thereof.

As best seen in FIGS. 2 and 3, only a simple guide rail 56 and lightweight positioning block 58 are provided for positioning the workpiece on the work table 12. A heavy duty means for clamping the workpiece to the work table 12 is not necessary in the present invention because of the high drilling speeds employed. The long narrow rectangular guide rail 56 is positioned adjacent the longer side edge of the work table 12 nearest the tool plate 14 and oriented facing the tool plate, with a longer side edge horizontal and parallel to said longer work table side edge, and the shorter side edge vertical. The guide rail 56 extends upward above the upper surface of the work table 12 for approximately one inch (1"). A guide rail drill opening 60 located on the vertical centerline of the guide rail 56 prevents the drilling element 24 from contacting the guide rail. The guide rail drill opening 60 comprises a semi-circular, one half inch ($\frac{1}{2}$") radius opening extending through the guide rail 56, oriented with the radial center of said opening aligned with an upper side edge of the guide rail.

The positioning block 58 comprises a wooden block measuring approximately two inches (2") wide, four inches (4") long, and one inch (1") thick, slidably attachable to the upper surface of the work table 12 by means of a threaded block bolt 12 and a positioning track 64. The block bolt 62 extends vertically through the center of the positioning block 58, with a wide flat head end extending below a lower horizontal surface of the positioning block, and an opposite threaded end extending above an opposed upper surface of said block. A conventional wing nut is threadably attached to the threaded free end of the block bolt 62. When attached to the work table 12, the round flat head of the block bolt 62 slides in the positioning track 64, which extends beneath the surface of the work table 12 parallel to and centered approximately one inch (1") inwardly from the longer side edge of the work table, and extending approximately one half inch downward into the work table. Two long, narrow, opposed block securing positioning track strips 66 having an upper surface flush with the upper surface of the work table 12 are disposed along either side of the positioning track 64, each anchored along a proximal edge to the body of the work table, and having a distal edge extending over the positioning track. The distal edges of the two opposed positioning track strips 66 are separated laterally from each other by a distance slightly greater than the diameter of the block bolt 62. The positioning block 58 is secured in place at any point along the positioning track 64 by tightening the wing nut on the threaded free end of the block bolt 62, progressively moving the flat head of the block bolt upward until an upper surface of said head engages the lower surfaces of the opposed positioning track strips 66, frictionally securing the positioning block in place.

It will be appreciated that, although specific embodiments of the high speed multiple tool dowel hole drilling machine of this invention have been described herein for purposes of illustration, various modifications may be made without departing from the spirit and scope of the invention. Accordingly, the invention is not limited except as by the following claims.

What is claimed is:

1. A high speed dowel hole drilling machine comprising:
   a work table for supporting a workpiece;
   a tool plate oriented perpendicularly to the work table, said tool plate having a tool plate drill opening extending between opposing surfaces of said plate;
   a high-speed rotary machine tool having
      a rotating drilling element,
      a drive means for rotating said drilling element at a speed between about 5,000 RPM and 30,000 RPM,
      control means for controlling the drive means so as to determine the speed of the drilling element, and
      non-rotary frame means for attachment of said machine tool;
   tool mounting means for removably attaching said machine tool to the tool plate such that the drilling element extends perpendicularly through the drill opening of said tool plate toward the work table, said tool mounting means including
      tool adaptor means for removably attaching any one of several different high-speed rotary machine tools to the tool plate, and
      plate mounting means for adjustably attaching the tool adaptor means together with the machine tool to the tool plate so that rotation of said tool adaptor means about an axis oriented perpendicularly to the plane of the tool plate and intersecting a side portion thereof raises or lowers the drilling element relative to an upper surface of the work table;
   carriage means for supporting the work table while allowing said work table to be translated perpendicularly toward and away from the tool plate; and
   support means for supporting the carriage means and the tool plate upon a horizontal work surface such as a workbench.

2. The high speed dowel hole drilling machine of claim 1, wherein the plate mounting means comprises
   two adaptor plate mounting holes extending through opposed first and second side portions of an adaptor plate of the tool adaptor,
   a tool plate mounting hole extending through a first side portion of the tool plate, and
   a vertically elongated tool plate mounting slot extending through a second side portion of said tool plate opposed to the first side portion.

3. A high speed dowel hole drilling machine comprising:
   a work table for supporting a workpiece;
   a tool plate oriented perpendicularly to the work table, said tool plate having a tool plate drill opening extending between opposing surfaces of said plate;
   a high-speed rotary machine tool having
      a rotating drilling element,
      drive means for rotating said drilling element at a speed between about 5,000 RPM and 30,000 RPM,
      control means for controlling the drive means so as to determine the speed of the drilling element, and
      non-rotary frame means for attachment of said machine tool;
   tool mounting means for removably attaching said machine tool to the tool plate such that the drilling element extends perpendicularly through the drill opening of said tool plate toward the work table;
   carriage means for supporting the work table while allowing said work table to be translated perpendicularly toward and away from the tool plate;
   support means for supporting the carriage means and the tool plate upon a horizontal work surface such as a workbench; and
   workpiece positioning means for positioning the workpiece in a desired position upon an upper surface of the work table, said workpiece positioning means comprising
      a recessed track in the upper surface of the work table, said track having opposed track strips flush with said surface of the work table,
      a positioning block having block securing means slidably engaging said track strip for securing said block in the desired position, and
      a vertical guide rail located adjacent a longer side of the work table nearer the tool plate.

* * * * *